(12) United States Patent
Wang et al.

(10) Patent No.: US 9,978,471 B2
(45) Date of Patent: May 22, 2018

(54) FLYING SPOT FORMING APPARATUS AND DESIGN METHOD

(71) Applicant: Powerscan Company Limited, Beijing (CN)

(72) Inventors: Yanhua Wang, Beijing (CN); Yanfeng Cao, Beijing (CN); Shaofeng Wang, Beijing (CN); Zheng Liu, Beijing (CN)

(73) Assignee: Powerscan Company Limited (CN)

( * ) Notice: Subject to any disclaimer, the term of this patent is extended or adjusted under 35 U.S.C. 154(b) by 0 days. days.

(21) Appl. No.: 15/124,126

(22) PCT Filed: Mar. 6, 2015

(86) PCT No.: PCT/CN2015/073762
§ 371 (c)(1),
(2) Date: Sep. 7, 2016

(87) PCT Pub. No.: WO2015/131847
PCT Pub. Date: Sep. 11, 2015

(65) Prior Publication Data
US 2017/0018323 A1  Jan. 19, 2017

(30) Foreign Application Priority Data

Mar. 7, 2014  (CN) .......................... 2014 1 0083256
Mar. 7, 2014  (CN) ....................... 2014 2 0103574 U
(Continued)

(51) Int. Cl.
*G21K 1/04*       (2006.01)
*G01V 5/00*       (2006.01)

(52) U.S. Cl.
CPC ........... *G21K 1/043* (2013.01); *G01V 5/0016* (2013.01)

(58) Field of Classification Search
None
See application file for complete search history.

(56) References Cited

U.S. PATENT DOCUMENTS 4,745,631 A * 5/1988 Paolini ..................... G21K 5/04
                                                        250/224
4,995,066 A * 2/1991 Harding ................... A61B 6/06
                                                        378/146
(Continued)

FOREIGN PATENT DOCUMENTS

CN        201173903 Y     12/2008
CN        202177591 U      3/2012
(Continued)

OTHER PUBLICATIONS

International Search Report for Application No. PCT/CN2015/073762 dated May 29, 2015.

*Primary Examiner* — Michael Logie
(74) *Attorney, Agent, or Firm* — Lerner, David, Littenberg, Krumholz & Mentlik, LLP

(57) ABSTRACT

A flying spot forming apparatus includes a radiation source and a shielding body. A side wall of the shielding body is provided with at least two pairs of helical grooves. Each helical groove is provided with a predetermined slope. A first incident groove is adjacent to a second incident groove. A head end of the first incident groove is higher than a head end of the second incident groove. A tail end of the first incident groove is higher than a tail end of the second incident groove. The tail end of the first incident groove is not higher than the head end of the second incident groove. A first axial cross section of the shielding body intersects with the tail end of the first incident groove. A second axial cross section intersects with the head end of the second incident groove.

20 Claims, 8 Drawing Sheets

(30) Foreign Application Priority Data

Sep. 19, 2014 (CN) .......................... 2014 1 0484473
Sep. 19, 2014 (CN) ..................... 2014 2 0542180 U

(56) References Cited

U.S. PATENT DOCUMENTS

| | | | |
|---|---|---|---|
| 5,555,123 A | 9/1996 | Kaplan | |
| 6,272,206 B1* | 8/2001 | Bjorkholm | G01N 23/04 |
| | | | 378/146 |
| 2011/0274250 A1* | 11/2011 | Gray | G01V 5/0025 |
| | | | 378/87 |
| 2012/0170716 A1* | 7/2012 | Chen | G01N 23/203 |
| | | | 378/87 |
| 2012/0288066 A1* | 11/2012 | Kang | G01N 23/203 |
| | | | 378/146 |
| 2014/0056410 A1* | 2/2014 | Zhao | G01V 5/0025 |
| | | | 378/87 |
| 2014/0153699 A1* | 6/2014 | Kaminski | G21K 1/043 |
| | | | 378/160 |

FOREIGN PATENT DOCUMENTS

| | | |
|---|---|---|
| CN | 102565110 A | 7/2012 |
| CN | 203773068 U | 8/2014 |
| CN | 104215650 A | 12/2014 |
| CN | 204116249 U | 1/2015 |

* cited by examiner

FLYING SPOT FORMING APPARATUS AND DESIGN METHOD

CROSS REFERENCE TO RELATED APPLICATIONS

The present application is a national phase entry under 35 U.S.C. § 371 of International Application No. PCT/CN2015/073762, filed Mar. 6, 2015, which claims priority from Chinese Patent Application Nos. 201410083256.3 filed Mar. 7, 2014; 201420103574.7 filed Mar. 7, 2014; 201410484473.3 filed Sep. 19, 2014; and 201420542180.1 filed Sep. 19, 2014, all of which are hereby incorporated herein by reference.

TECHNICAL FIELD

The present invention relates to a technical field of radiation imaging, and specifically to a flying spot forming apparatus and a method for designing the flying spot forming apparatus.

BACKGROUND OF THE INVENTION

Currently, a flying spot scanning apparatus based on a rotatable shielding mechanism is used for security check. The rotatable shielding mechanism is a circular cylinder, provided on its side wall with a helical line type gap for rays to be incident into and exiting the cylinder. During rotation of the circular cylinder, the ray, after passing through a slot collimator, irradiates the circular cylinder, and the radiated particle passes through the helical line shaped gap to form a flying spot. A scanning line is formed by high speed movement of the flying spots and is used to scan a moving object under detection. Such flying spot scanning apparatus can be used for non-destructive testing, security check, etc.

FIG. 1 is a use state diagram of a flying spot scanning apparatus. A slot collimator 3 is placed between a radiation source 1 and a shielding body 5 which is a hollow circular cylinder and is placed horizontally. An object 8 under detection is shown on the right, moving in a direction of the arrow 11. The shielding body 5 is provided on its side wall with a pair of helical line shaped gaps 6', 6". A ray radiated from the radiation source 1 passes through a line gap 2 on the slot collimator 3 and thus is constrained into a sector-shape beam of rays 4, and then is irradiated onto the circular cylinder 5. When the shielding body 5 rotates around its central axis (with a rotation direction as indicated by the arrow 12), the rays of the sector-shape beam of rays 4 incident from the gap 6' pass through the gap 6" and thus exit the cylinder (obviously, the positions of the gaps 6' and 6" correspond to each other), forming a pen-shape beam of rays 10. As the shielding body 5 continues to rotate, the flying spots exiting the gap 6" form a plurality of pen-shape beams of rays. The object 8 under detection is moved in the direction as shown by the arrow 11 within the scanning range to complete a flying spot scanning.

It should be noted that process of forming flying spots is illustrated in principle in FIG. 1, reflecting the principle of forming flying spots, but in practical applications, the helical line shaped gaps 6', 6" on the shielding body 5 cannot be designed completely according to FIG. 1 since the rays radiated from the radiation source 1 are in a form of conical beam of rays with the focus of the radiation source as its circle center, rather than parallel rays. The collimated sector-shaped beam of rays with different opening angles passes through the shielding body 5. Therefore, the paths of the rays within the shielding body 5 are not parallel to one another, but are angled with respect to one another. Thus, if the gap 6', 6" are distributed along a direction of the full height of the shielding body 5 as shown in FIG. 1, definitely some of the gaps never receive any ray to pass through, and some incident rays are shielded and thus cannot exit the cylinder.

The shielding body of the flying spot forming apparatus that is used in practice is shown in FIG. 2, wherein the view on the left is a side view of the shielding body vertically placed, while the view on the right is a spread view of the side wall of the shielding body and the spread side wall is presented to be a rectangular plate having a certain thickness. In the view of the spread side wall, two gaps "he", "h'e'" can be clearly seen wherein "he" is an incident groove, similar to the gap 6', with the distribution thereof being limited within a circumferential range of 180 degrees; while "h'e'" is an exit groove, similar to the gap 6", with the distribution thereof being limited within another circumferential range of 180 degrees. At a certain time point, a ray radiated from the radiation source may be incident from a point on the incident groove "he" (such as a middle point of "he") and exit from a corresponding point on the exit groove "h'e'" (such as a middle point of "h'e'") to form a flying spot, being consistent with the principle of forming flying spots.

However, in the flying spot scanning apparatus in FIG. 2, the incident groove "he" and the exit groove "h'e'" each occupies a half of the space of the side wall and the exit groove "h'e'" is distributed along a direction of the full height of the side wall. Such structure causes poor tension resistant properties of the side wall such that the shielding body is vulnerable to deformation during high speed rotation, and thus influences the scanning quality.

SUMMARY OF THE INVENTION

In the present invention, a flying spot forming apparatus and a method for designing the flying spot forming apparatus are provided, wherein the number and positions of the helical grooves on the shielding body are configured reasonably, thereby improving the tension resistant properties of the shielding body.

In the present invention, a flying spot forming apparatus is provided, and it comprises a radiation source and a shielding body which is a hollow circular cylinder and has a side wall provided with helical grooves in pairs, with each pair of helical grooves comprising an incident groove and an exit groove; the side wall of the shielding body is provided with at least two pairs of helical grooves, and each helical groove has a predetermined slope with respect to a cross section of the shielding body; a first incident groove of the at least two pairs of helical grooves, is adjacent to a second incident groove of the at least two pairs of helical grooves, a head end of the first incident groove is higher than a head end of the second incident groove, a tail end of the first incident groove is higher than a tail end of the second incident groove, the tail end of the first incident groove is spaced apart from the head end of the second incident groove by a predetermined distance, the tail end of the first incident groove is not higher than the head end of the second incident groove; a first axial cross section of the shielding body intersects with the tail end of the first incident groove, a second axial cross section intersects with the head end of the second incident groove, and an included angle between the first and second axial cross sections is greater than 0 degree; and the position of the exit groove of the at least two pairs of helical grooves corresponds to the position of the incident groove arranged in pair with said exit groove.

In the present invention, a method for designing a flying spot forming apparatus is further provided. The flying spot forming apparatus comprises a radiation source and a shielding body which is a hollow circular cylinder and has a side wall provided with helical grooves in pairs, with each pair of helical grooves comprising an incident groove and an exit groove. The designing method comprises: arranging at least two incident grooves on the side wall of the shielding body, each incident groove having a predetermined slope with respect to a cross section of the shielding body, wherein a first incident groove of the at least two pairs of incident grooves is adjacent to a second incident groove of the at least two pairs of incident grooves, a head end of the first incident groove is higher than a head end of the second incident groove, a tail end of the first incident groove is higher than a tail end of the second incident groove, the tail end of the first incident groove is spaced apart from the head end of the second incident groove by a predetermined distance, the tail end of the first incident groove is not higher than the head end of the second incident groove; and an included angle between a first axial cross section and a second axial cross section is greater than 0 degree, wherein the first axial cross section is an axial cross section intersecting with the tail end of the first incident groove and the second axial cross section is an axial cross section intersecting with the head end of the second incident groove; and according to a position of a focus of the radiation source and a position of each incident groove of the at least two incident grooves, determining a position of each exit groove that is arranged in pair with the corresponding incident groove.

In the present invention, a flying spot forming apparatus is further provided, and it, comprises a shielding body which is a hollow circular cylinder and has a side wall provided with elongate helical grooves in pairs, and a radiation source placed outside the shielding body, wherein the side wall of the shielding body is provided with N pairs of helical grooves and N≥2, with each pair of helical grooves comprising an incident groove and an exit groove, wherein with a single transverse section of the shielding body being referred to as a boundary, M pair(s) of helical grooves is/are placed at one side of the single transverse section while (N-M) pair(s) of helical grooves is/are placed at the opposite side of the single transverse section, wherein the transverse section of the shielding body is parallel to a bottom plane of the shielding body and M<N; all the incident grooves are placed within a range covered by a sector-shape beam of rays from the radiation source, and any transverse section of the shielding body intersects at most two of the incident grooves; each incident groove has an inclination angle with respect to the transverse section of the shielding body, and a predetermined distance is provided between two adjacent incident grooves; and the position of the exit groove corresponds to the position of the incident groove that is arranged in pair with said exit groove.

In the present invention, a method for designing a flying spot forming apparatus is further provided, and it comprises: according to a range covered by a sector-shape beam of rays from the radiation source and a size of the shielding body, determining an installing position of the radiation source; arranging N pairs of elongate helical grooves on a side wall of the shielding body, with each pair of helical grooves comprising an incident groove and an exit groove and N≥2; wherein, as for arrangement of the N pairs of elongate helical grooves, with a single transverse section of the shielding body being referred to as a boundary, M pair(s) of helical grooves is/are placed at one side of the single transverse section while (N-M) pair(s) of helical grooves is/are placed at the opposite side of the single transverse section, wherein the transverse section of the shielding body is parallel to a bottom plane of the shielding body and M<N; configuring all the incident grooves such that they are within a range covered by a sector-shape beam of rays from the radiation source and any transverse section of the shielding body intersects at most two of the incident grooves; configuring each incident groove such that each incident groove has an inclination angle with respect to the transverse section of the shielding body, and a predetermined distance is provided between two adjacent incident grooves; and configuring the exit groove such that the position of the exit groove corresponds to the position of the incident groove arranged in pair with said exit groove.

DESCRIPTION OF EXEMPLARY EMBODIMENTS

Hereinafter, the technical solutions of the present invention will be described in detail in connection with specific embodiments and with reference to the accompanying drawings.

According to the principle for forming the flying spots, the incident groove and the exit groove on the shielding body of the flying spot forming apparatus corresponds to each other, and the corresponding relation therebetween can be described as follows: the incident groove and the exit groove are sized and arranged such that during rotation of the shielding body, at a certain time point, three points, i.e. the radiation source focus, the incident point and the corresponding exit point, are aligned in line with one another. For example, referring to the view on the left in FIG. 2, at the time point t1, three points, i.e. the radiation source focus P, the incident point h and the corresponding exit point h', are aligned in line with one another; after the shielding body is rotated by 180° C. (time point t2), the radiation source focus P, the incident point e and the corresponding exit point e', are aligned in line with one another. The incident groove and the exit groove can be regarded as consisting of innumerable incident points and exit points, respectively. Thus, in the time period from t1 to t2, each point on the incident groove "he" exactly corresponds to each point on the exit groove "h'e'". Any incident point or exit point that fails to comply with such corresponding relation would not result in the forming of a flying spot. Therefore, as can be seen from above, once the position of the radiation source are determined with respect to the position of the shielding body and the incident grooves on the shielding body are determined, the exit grooves are determined.

Figure 3:
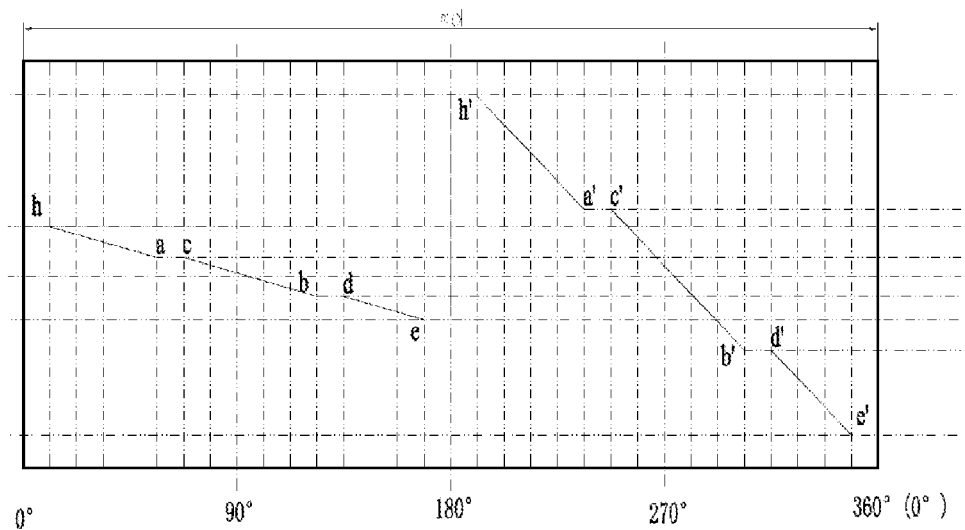
FIG. 3 is a spread view of a side wall of a shielding body according to an embodiment of the present invention, showing three segments of incident grooves.

FIG. 3 shows a spread view of a side wall of a shielding body according to an embodiment of the present invention, wherein the radiation source is not shown. The shielding body has three segments of incident grooves ha, cb, de and three segments of corresponding exit grooves h'a', c'b', d'e'. The three segments of incident grooves are continuous within each segment and the three segments of exit grooves are continuous within each segment. Hereinafter, in order to facilitate description, it is assumed that the shielding body is vertically placed, with the bottom plane of the shielding body extending in the horizontal plane and the rotation central axis of the shielding body extending in the vertical direction.

Specifically, in the embodiment of FIG. 3, the end a of the incident groove ha is at the same height as the end c of the incident groove cb, with a certain distance between the two end points. Also, end b of the incident groove cb is at the same height as the end d of the incident groove de, with a certain distance between the two end points.

The sizes and the positions of the three segments of the exit grooves h'a', c'b', d'e' can be determined according to the radiation source and the incident grooves. In the present embodiment, end a' of the incident groove h'a' is at the same height as the end c' of the incident groove c'b', with a distance between the two end points. Also, end b' of the incident groove c'b' is at the same height as the end d' of the incident groove d'e', with a distance between the two end points.

According to the above design, a hollow circular cylinder is made, which results in a shielding body with three segments of incident grooves and three segments of exit grooves, wherein the incident groove is continuous within each segment and the exit groove is continuous within each segment. In the present embodiment, any axial cross section of the circular cylinder will not simultaneously intersect two incident grooves and also will not simultaneously intersect two exit grooves.

Figure 1:
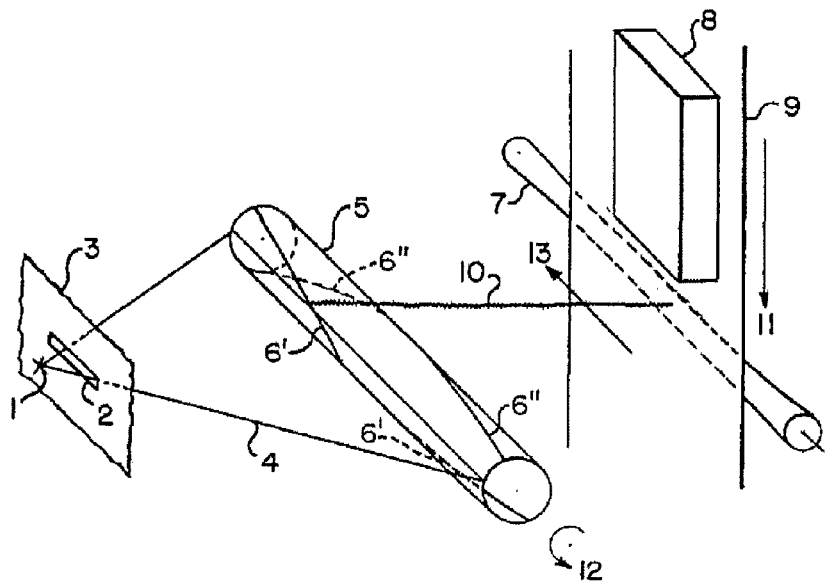
FIG. 1 is a use state diagram of a flying spot scanning apparatus in the prior art.
Figure 2:
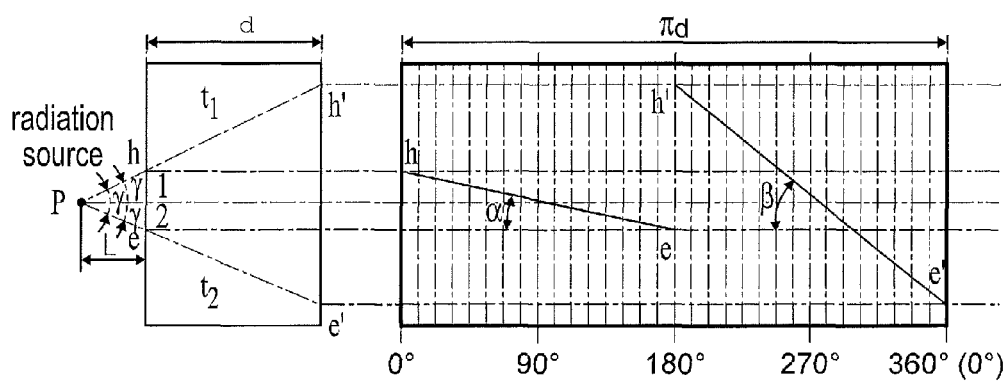
FIG. 2 is a schematic diagram of a shielding body of a flying spot forming apparatus in the prior art.

Referring to FIG. 3 in combination with FIG. 2, based on the incident groove "he" in FIG. 2, a slight adjustment is made: shortening the length of the incident groove, selecting any two points in "he" as the separating points to separate "he" at the separating points such that "he" is separated into three shorter segments of helical grooves, and moving at least two of the three segments such that the three segments of helical grooves are spaced apart from one another, with the distances therebetween equal to each other or different from each other. For example, as shown in FIG. 3, for ha, cb, de, the two distances ac and bd are equal to each other in length. Regarding the exit groove h'e', it may be processed correspondingly, resulting in the segments h'a', c'b', d'e'.

In the embodiment of FIG. 3, the three segments of incident grooves ha, cb, de are at the same angle with respect to the horizontal line. That is, the straight lines corresponding to the three segments of incident grooves have the same slope. In some embodiments of the present invention, the incident grooves may be at different angles with respect to the horizontal line. For example, the angles of ha, cb, de with respect to the horizontal line are defined as $\angle A$, $\angle B$, $\angle C$, respectively, with $\angle A = \angle B = \angle C$ in FIG. 3. In some cases (when the machining precision is not high), it is not necessary for the three angles to be equal to one another. It is possible to make $\angle A \neq \angle B \neq \angle C$, as long as the three incident grooves are continuous in the height direction (that is, the ends a and c are at the same height, and the ends b and d are at the same height), thus allowing the rays to be incident continuously.

Further, in consideration of the issue of machining precision for the shielding body, in some embodiments of the present invention, it is not necessary to strictly design that the ends a and c are at the same height and the ends b and d are at the same height. Specifically, they may be processed in the following manner: referring to FIG. 3, extending the length of ha (assuming the end h is fixed), moving the end a along the length direction of ha by a certain distance such that the end a is lower than the end c. That is, ha and cb are partially overlapped in the height direction, which still complies with the arranging principle of extending continuously within each segment in the present invention. It should be noted that when the scanning data of the flying spots are to be processed later, the data generated through the overlapped portion of ha and cb in the height direction should be removed, and only the scanning data of the continuous flying spots are remained. Thus, a high imaging quality is ensured.

Hereinbefore, the arranging principle of "extending continuously within each segment" of the helical grooves of the present invention is described. In the flying spot forming apparatus including the shielding body according to the embodiment(s) of the present invention, based on the premise that the principle of forming flying spots is satisfied, the several helical grooves on the shielding body are arranged with a distance(s) therebetween. The helical grooves have a relatively short length. Therefore, the shielding body has a higher rigidity, and thus is more resistant against deformation during high speed rotation operation and has better tension resistant properties.

Figure 4:
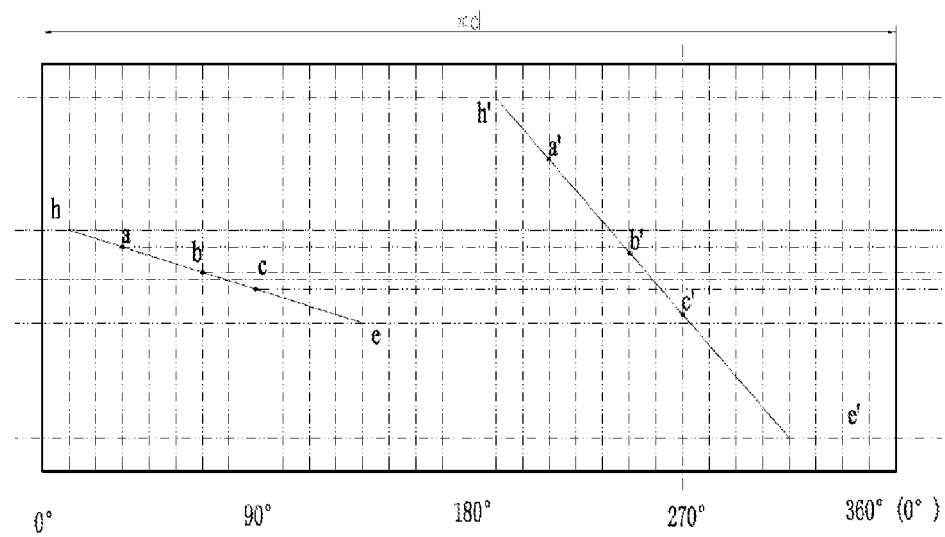
FIGS. 4 and 5 are spread views of a side wall of a shielding body according to embodiments of the present invention, showing four segments of incident grooves.
Figure 5:
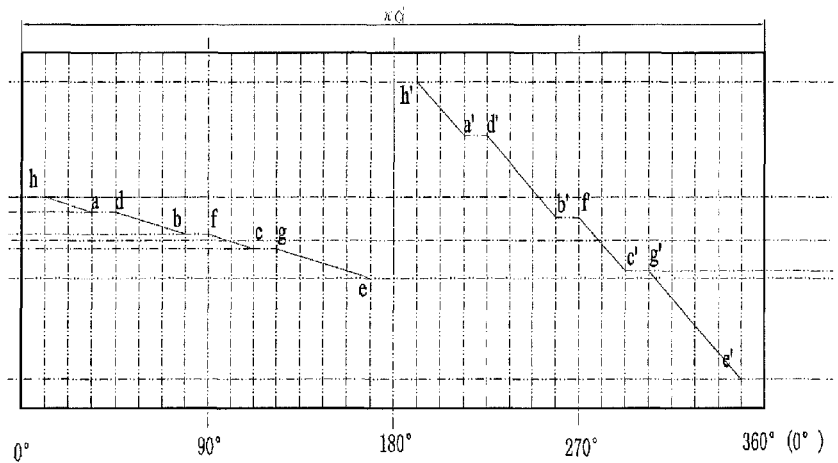

In some embodiments of the present invention, the shielding body may be provided thereon with two, four, five or more segments of incident grooves. The multiple segments of incident grooves are continuous within each segment. The exit groove and incident groove correspond to each other. FIG. 4 and FIG. 5 show the cases with four segments of incident grooves. Specifically, three points a, b, c in the incident groove "he" are selected, and the incident groove "he" is separated at the selected points into four segments; the four segments of the incident grooves are moved such that they are spaced apart from one another. For example, as shown in FIG. 5, ha, db, fc, ge are obtained, and these four segments are continuous within each segment. Regarding the exit groove, it may be processed correspondingly, and thus four segments h'a', d'b', f'c', g'e' which are continuous within each segment, are obtained.

Comparatively, when the shielding body has a relatively large diameter, more helical grooves may be contained in the lateral direction; while when the shielding body has a relatively large height, more helical grooves may be contained in the longitudinal direction.

On the other hand, in the embodiment of FIG. 3, the incident grooves ha, cb, de are distributed within a circumferential range of 0-180 degrees of the shielding body, and the exit grooves h'a', c'b', d'e' are distributed within a circumferential range of 180~360 degrees of the shielding body. This means that during one revolution of the shielding body, the flying spots can be formed only within the circumferential range of 0~180 degrees, rather than that of 180~360 degrees. That is, in the rotation cycle of the shielding body, about ½ of the time period cannot be used to obtain the scanning data, and thus the scanning efficiency is low.

In order to improve the scanning efficiency, in the present invention, the distribution range of the multiple segments of incident grooves is extended to be within a circumferential range of 360 degrees, and the positions of the multiple segments of the corresponding exit grooves are determined according to the position of the radiation source. For example, referring to the embodiment of FIG. 6, the incident grooves ha, cb, de are distributed within a circumferential range of 0~360 degrees of the shielding body, and these three segments are continuous within each segment. Compared with the embodiment of FIG. 3, the arrangement in the embodiment of FIG. 6 can increase the length of the incident groove(s). Regarding the positions of the exit grooves h'a', c'b', d'e', it can be seen from FIG. 6 that the exit grooves h'a', c'b', d'e' are also distributed within a circumferential range of 0~360 degrees of the shielding body and have a larger distribution range in the height direction than that of the incident grooves ha, cb, de.

Figure 6:
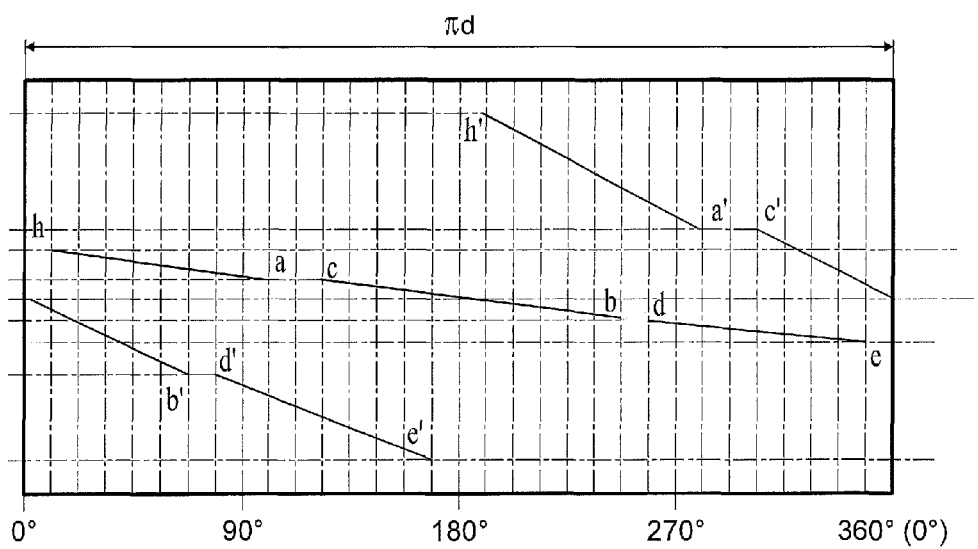
FIG. 6 is a spread view of a side wall of a shielding body according to another embodiment of the present invention, showing three segments of incident grooves.

Based on the embodiment of FIG. 6, a hollow circular cylinder is made as the shielding body of the flying spot forming apparatus. Compared with the shielding body in the embodiments of FIG. 2 and FIG. 3, in the embodiment of FIG. 6, the three segments of incident grooves are distributed in the whole rotation cycle of the shielding body. The case where a ray cannot be incident is eliminated. Therefore, at any time point in the scanning process, the flying spots can be formed and the scanning data is obtained. Thus the scanning efficiency is improved.

As the three segments of incident grooves in the embodiment of FIG. 6 are distributed in the whole rotation cycle of the shielding body, one axial cross section of the circular cylinder may simultaneously intersect two incident grooves. For example, in FIG. 6, the axial cross section intersecting the end h of the incident groove ha may also intersect a certain point of the incident groove cb which is at a different height from point h, with a radial difference of $\pi$ radian, and falls on the same axial cross section.

In some embodiments of the present invention, the shielding body may be provided thereon with two, four, five or more segments of incident grooves. The multiple segments of incident grooves are continuous within each segment and are distributed in the whole rotation cycle of the shielding body. The exit groove and incident groove correspond to each other.

It should be understood that as the multiple segments of incident grooves are distributed in the whole rotation cycle of the shielding body and the corresponding exit grooves are also distributed in the whole rotation cycle of the shielding body, it may happen that one or more exit grooves may intersect with other incident groove(s); if this happens, it means that the current arrangement manner is not appropriate, and it is therefore necessary to rearrange the positions of the incident grooves and the exit grooves. The incident grooves can be rearranged by adjusting the slope(s) of the incident grooves, adjusting the distance(s) between the incident grooves, and/or adjusting the length(s) of the incident grooves, etc. Then the exit grooves may be adjusted correspondingly. As a result, the helical grooves are spaced apart from one another.

Figure 7:
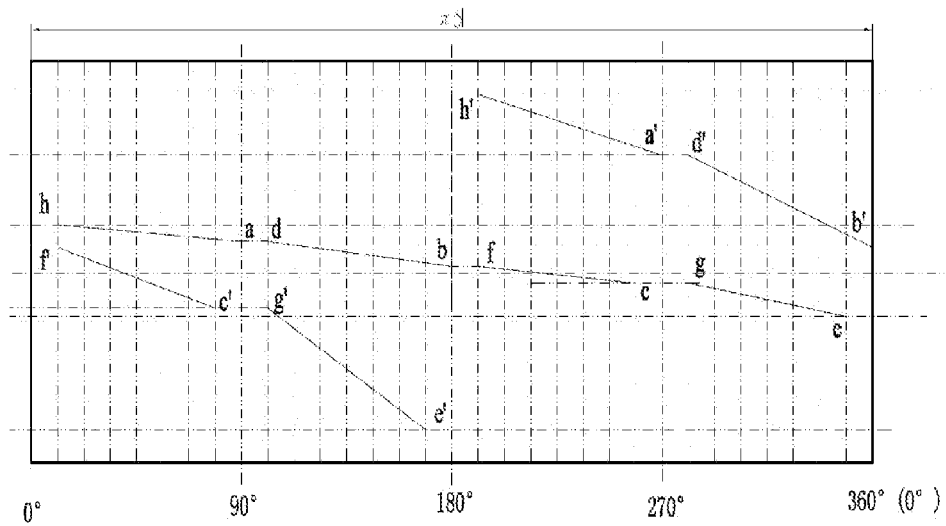
FIG. 7 is a spread view of a side wall of a shielding body according to another embodiment of the present invention, showing four segments of incident grooves.

For example, FIG. 7 shows the case with four segments of incident grooves. The incident grooves ha, db, fc, ge are distributed within a circumferential range of 0~360 degrees of the shielding body, and these four segments are continuous within each segment. Further, as described above, the slopes of the multiple segments of incident grooves may be equal to one another or may be different from one another, and the distance between adjacent incident grooves may be equal to one another or may be different from one another. As seen in detail, in the four segments of incident grooves in FIG. 7, the slope of ge is obviously larger than the slopes of the other three incident grooves, and the length of the distance cg between fc and ge is obviously larger than the length of ad or bf. Accordingly, in the four segments of exit grooves, the slope of g'e' is larger than the slopes of the other three exit grooves, and the length of c'g' is larger than the length of a'd' or b'f'. This design results in the following advantages: the angles of the helical grooves and the distances therebetween can be flexibly adjusted according to the size of the side wall of the shielding body, the incident grooves and the exit grooves on the side wall of the shielding body can be distributed as uniform as possible based on the premise that the principle of forming flying spots is satisfied, deformation due to overstress in a certain direction or on a certain point during high speed rotation can thus be avoided, and the rigidity of the shielding body in the maximum extent are improved.

Figure 8:
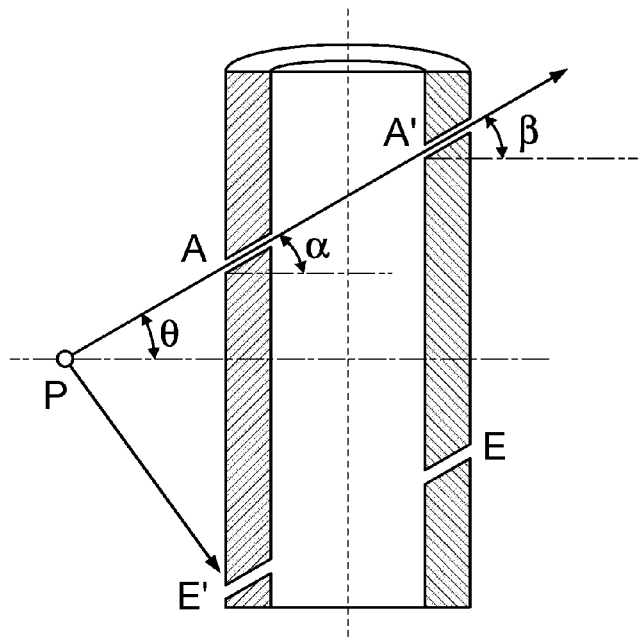
FIG. 8 is a longitudinal section view of a shielding body according to an embodiment of the present invention.

In addition, in the process of machining the shielding body, an issue related to the cut direction(s) of the helical grooves should be noted. The cut direction(s) of the incident grooves and the exit grooves should be determined based on the position of the radiation source, the distance from the radiation source to the shielding body, and the positions of the incident grooves and the exit grooves on the shielding body. FIG. 8 shows a longitudinal section view of a shielding body according to an embodiment of the present invention. The side wall of the shielding body has a certain thickness (the shadowed portion in the Figure). There are four cuts on the side wall, i.e. the cuts of the incident grooves and the exit grooves. The point P represents the focus of the radiation source. The Figure schematically shows a process of forming a flying spot at a time point. Specifically, A and A' are cuts of a pair of incident groove and corresponding exit groove, $\alpha$ is an angle of the cut direction of the cut A with respect to the horizontal plane and $\beta$ is an angle of the cut direction of the cut A' with respect to the horizontal plane, and $\alpha=\beta$; E and E' are cuts of another pair of incident groove and corresponding exit groove; $\theta$ is an angle of the incident direction of a certain ray with respect to the horizontal plane at this time point. It should be noted that at this time point, $\alpha=\beta=\theta$, and thus the ray can pass through A (incident) and A' (exit) to form a flying spot. For other rays at the same time point, such as a ray reaching E', its incident direction is different from the cut direction of the cut E', and thus the ray is shielded and cannot pass through the shielding body to exit. Therefore, at this time point, there will not form another flying spot that is consistent with the principle of forming flying spots. With rotation of the shielding body, when the cut E is rotated to the incident plane, the incident direction of the ray is consistent with the cut directions of the cuts E and E', thus forming a flying spot.

In practical applications, the higher the rotation speed of the circular cylinder is, the clearer the detected image is. As can be seen from the solutions of the present invention, the separating points of the segments of incident grooves are selected arbitrarily despite of the number of the incident grooves, i.e., no matter whether it is separated into three segments, four segments or more segments. In order to make the rotation speed of the circular cylinder as high as possible, the positions of the separating points should be selected appropriately. Furthermore, mechanical analysis means may be used to mechanically analyze the circular cylinder for different separating manners, thus selecting the optimal solution, improving the rigidity of the circular cylinder, increasing the rotation speed and improving the image definition.

Figure 9:
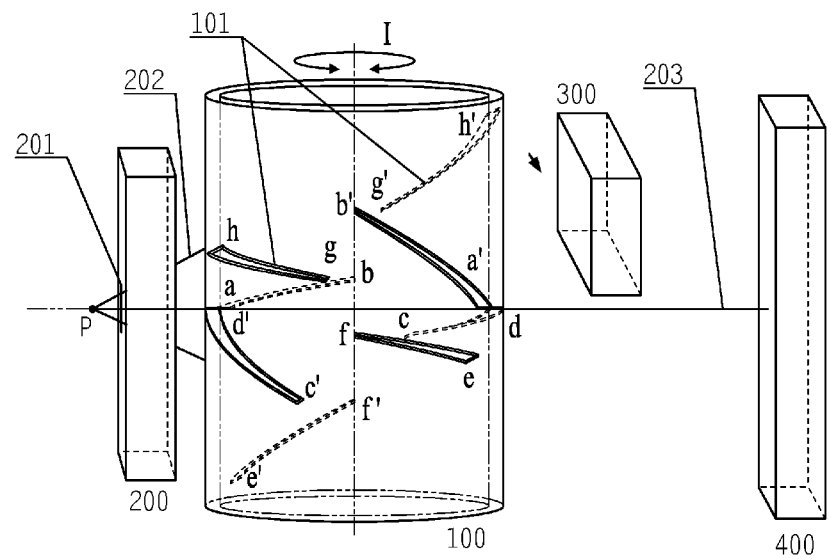
FIG. 9 is a use state diagram of a flying spot forming apparatus according to an embodiment of the present invention.
Figure 10:
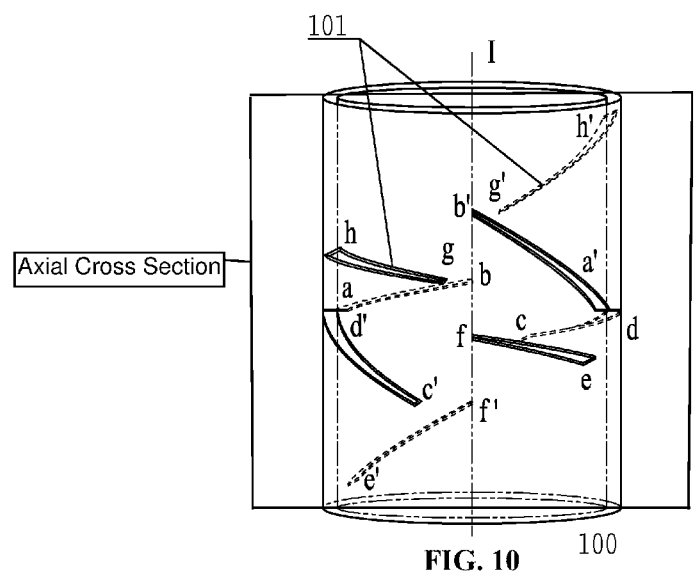
FIG. 10 is a schematic structural diagram of a shielding body in the flying spot forming apparatus according to the embodiment of FIG. 9.

FIG. 9 shows a use state diagram of a flying spot forming apparatus according to an embodiment of the present invention. FIG. 10 shows a shielding body in the embodiment of FIG. 9. The shielding body 100 is a hollow circular cylinder, placed vertically in the Figure, and is rotatable around the central axis I. The side wall of the shielding body 100 is provided with several segments of elongate helical grooves (slots). For example, a pair of helical grooves 101 include an incident groove hg and an exit groove h'g'. Outside the shielding body 100, the point P represents the radiation source which may provide X rays, for example, and irradiate the rotating shielding body 100.

In use, a slot collimator 200 is placed between the radiation source P and the shielding body 100. The X rays is radiated from the radiation source P, passing through a slot 201 on the slot collimator 200, being constrained into a sector-shape beam of rays 202, and hitting the rotating shielding body 100. The rays then pass through the shielding body 100 via the incident groove and the exit groove to form flying spots flying out. As shown in FIG. 9, after the ray passes through the end a of the incident groove ab and the end a' of the exit groove a'b', a flying spot flies out, forming a pen-shape beam of rays 203.

The incident grooves may be arranged within the covering range of the sector-shape beam of rays 202, and the flying spots can continuously fly out of the corresponding exit grooves. Scanning can be performed when the object 300 under detection is moved in a direction indicated by the arrow, and with the cooperation of a radiation detector 400, a radiation scanning image of the object 300 under detection can be obtained, to provide evidence for security check.

Figure 11:
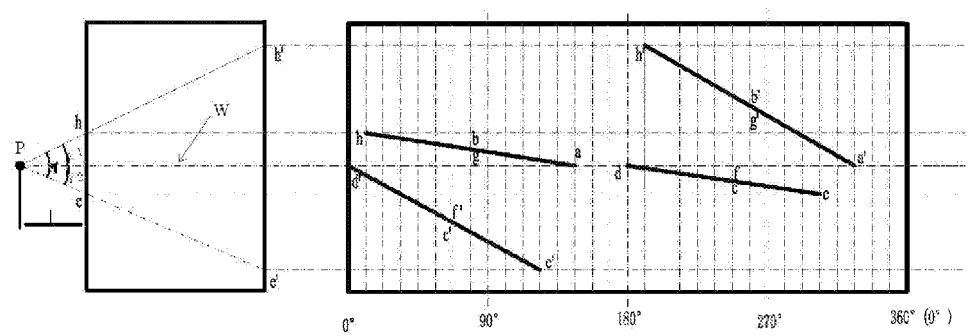
FIGS. 11-14 are schematic diagrams of a shielding body and schematic spread view of its side wall according to embodiments of the present invention.

FIG. 11 is a schematic diagram of a shielding body and schematic spread view of its side wall according to an embodiment of the present invention. The view on the left shows a main body of the shielding body and the view on the right is a spread view of the side wall. The spread side wall is presented to be a rectangular plate having a certain thickness.

Regarding the several segments of helical grooves on the shielding body 100, in the embodiment of FIG. 11, the side wall is provided thereon with two pairs of helical grooves, the first pair of helical grooves ha, h'a' and the second pair of helical grooves de, d'e', wherein ha and de are incident grooves while h'a' and d'e' are exit grooves. In FIG. 11, the horizontal dashed line passing through the radiation source P identifies a transverse section W of the shielding body, with the first pair of helical grooves ha, h'a' above the transverse section W and the second pair of helical grooves de, d'e' below the transverse section W, and the transverse section W is parallel to the bottom plane of the shielding body.

Figure 12:
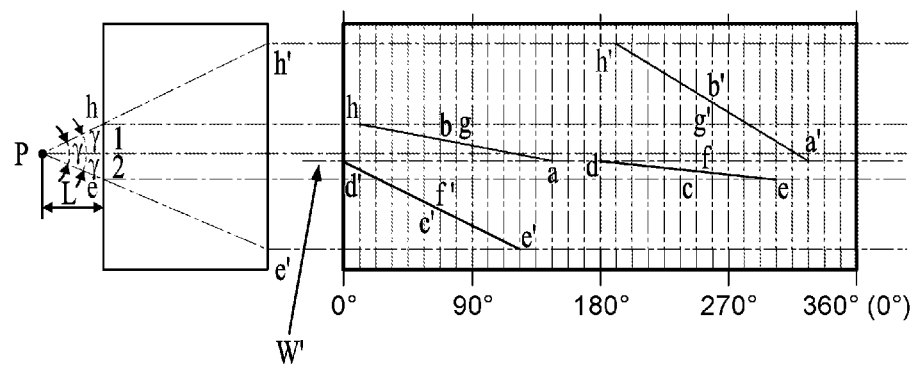

In some embodiments of the present invention, the transverse section W may not pass through the radiation source P. For example, in the embodiment of FIG. 12, the transverse section W' is below the horizontal dashed line passing through the radiation source P, with the first pair of helical grooves ha, h'a' above the transverse section W' and the second pair of helical grooves de, d'e' below the transverse section W'.

In order to ensure the continuity of flying spots, the position relation between the tail end of one incident groove (ha) and the head end of another incident groove (de) is considered. In some embodiments of the present invention, the end a of the incident groove ha and the end d of the incident groove de are at the same height. Referring to FIG. 11, both ends a and d fall on the transverse section W and are spaced apart from each other by a certain distance, and ha and de have the same inclination angle with respect to the transverse section W. when the ends a and d are overlapped, the incident groove ha and the incident groove de are collinear. In this case, the flying spots flying out are strictly successively continuous.

In some embodiments of the present invention, the end a of the incident groove ha and the end d of the incident groove de may be at different heights. For example, the position of the end e is fixed while the length of the incident groove de is extended such that the end d will be higher than the transverse section W and thus higher than the height of the end a of the incident groove ha. Regarding the exit groove d'e', it may be adjusted correspondingly, thus ensuring continuous flying spots. It should be noted that when the scanning data of the flying spots are to be processed later, the data of the overlapped portion of de and ha in the height direction should be removed, and thus what is remained is the scanning data of continuous flying spots, ensuring a high imaging quality. This technical solution may be considered and adopted in practical machining process, since it is not easy to precisely position the ends a and d at the same height due to the issue in connection with the processing precision for forming the helical grooves on the shielding body.

In some embodiments of the present invention, ha and de may have different inclination angles with respect to the transverse section W. For example, the end d of de may be rotated clockwise around the end e by an angle, thus the ends d and a are different in height, and when the ends a and d are overlapped, ha and de are not collinear, but form an angle therebetween, such as 170°, 175°, 178°, etc. The angle of the exit groove d'e' may be adjusted correspondingly. With such configuration, the continuity of the flying spots can be ensured. The exit grooves h'a' and d'e' are configured in position corresponding to the incident grooves ha and de. That is, the positions of the incident grooves on the shielding body, after being rotated by 180°, should correspond to the positions of the exit grooves. The height(s) of the exit grooves should ensure that the ray from the radiation source, after passing through the incident groove, can then just pass through the exit groove, thus forming a flying spot. For example, a connection line h'h from the end h' of the exit groove h'a' to the end h of the incident groove ha on the shielding body passes through the radiation source P. Therefore, it can be seen that if the configuration of the incident groove is determined, the configuration of the exit groove arranged in pair with this incident groove can be thus determined.

In addition, the incident grooves ha and de are restricted within the range covered by the sector-shape beam of rays radiated from the radiation source, thus resulting in a high utilization rate of the rays.

Figure 13:
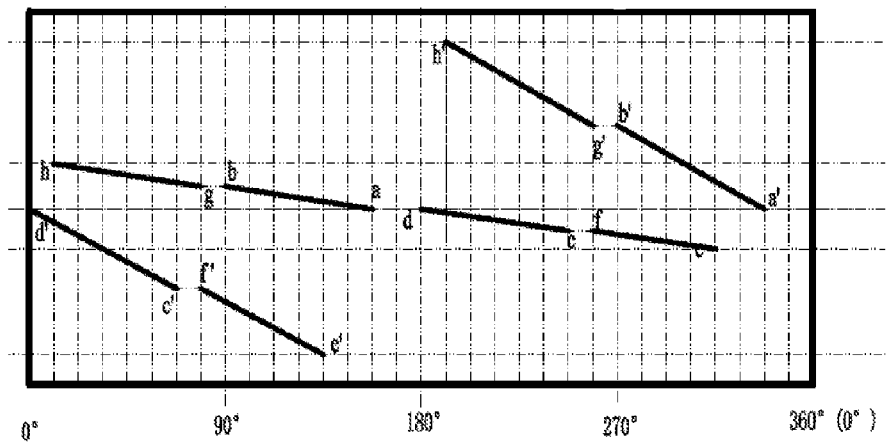

FIG. 13 shows a spread diagram of a side wall of a shielding body in a flying spot scanning apparatus according to an embodiment of the present invention (with the radiation source not shown). This embodiment shares the same design principle for arranging the helical grooves as the embodiment of FIG. 11, but differs from the latter in number and specific arrangement positions of the helical grooves.

Specifically, in the embodiment of FIG. 13, the side wall of the shielding body is provided with four pairs of helical grooves: the first pair of helical grooves hg, h'g', the second pair of helical grooves ba, b'a', the third pair of helical grooves dc, d'c', and the fourth pair of helical grooves fe, f'e', wherein hg, ba, dc, fe are incident grooves while h'g', b'a', d'c', f'e' are exit grooves. The first and second pairs of helical grooves are above the transverse section W while the third and fourth pairs of helical grooves are below the transverse section W The embodiment of FIG. 13 can be obtained by separating each of the four segments of helical grooves in FIG. 11 into two segments, and then positioning the obtained eight segments of helical grooves spaced apart from one another by a certain distance; for example, the original incident groove ha is separated into the incident groove hg and the incident groove ba, and the original exit groove h'a' is separated into the exit groove h'g' and the exit groove b'a'; other segments may follow the same rule. Compared with the embodiment of FIG. 11, in the embodiment of FIG. 13, the number of the helical grooves is increased. This means that, with the diameter of the shielding body being fixed, if the shielding body made of rigid material has more connected segments, the shielding body will have higher tension resistant properties, and thus the reliability and safety of the scanning detection will be improved.

For the same reason(s), in some embodiments of the present invention, the incident groove ha may be separated into more segments, such as three segments, four segments, five segments or more segments. The number of separated segments is not limited theoretically and may be determined according to the diameter, height, etc., of the shielding body, and preferably according to the machining processing and the application requirement(s). The larger the diameter of the shielding body is and/or the larger the height thereof is, the more the helical grooves are allowed to be provided.

In the embodiment of FIG. 13, the position relation between the tail end of one incident groove and the head end of another adjacent incident groove may be configured according to the embodiment of FIG. 11, to ensure the continuity of flying spots.

Further, in the embodiment of FIG. 13, as for the distances between the tail end of one incident groove and the head end of another adjacent incident, such as gb, ad, cf, etc., they may be configured as equal to one another or may be configured as different from one another. In the embodiment of FIG. 13, gb=cf≠ad.

Figure 14:
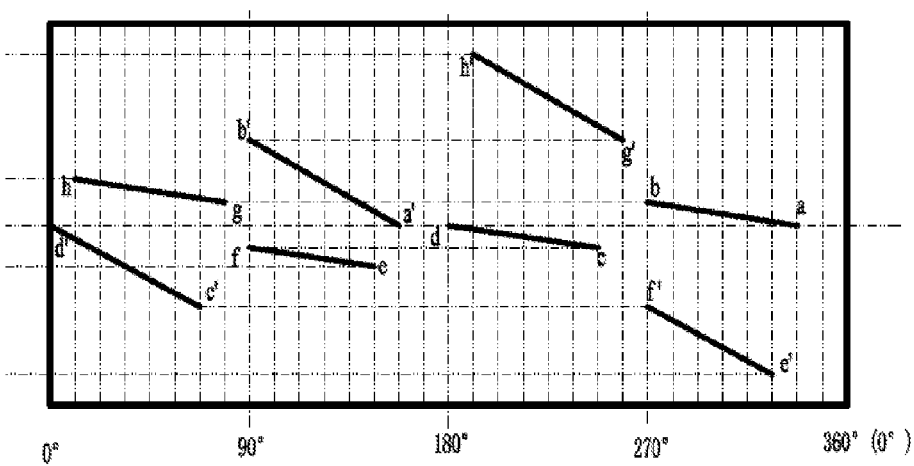

Preferably, based on the embodiment of FIG. 13, the distances between the four incident grooves are changed, and meanwhile considering in combination with the respective positions of the four exit grooves, the distances between adjacent helical grooves are adjusted to be as large as possible, resulting in the helical grooves with the position relation thereof as shown in FIG. 14, wherein gf≠ed≠cb. That is, the distances between the tail end of one incident groove and the head end of another adjacent incident groove are all different from one another. Compared with the embodiment of FIG. 13, in the embodiment of FIG. 14, the helical grooves are distributed more diffusively, extend the distance between the helical grooves to the maximum extent and thus maximize the tension resistant properties of the shielding body.

In some embodiments of the present invention, the first pair of helical grooves hg, h'g' may be above the transverse section W while the other three pairs of helical grooves may be all below the transverse section W. Similarly, the first, second and third pairs of helical grooves may be all above the transverse section W while the fourth pair of helical grooves may be below the transverse section W.

In some embodiments of the present invention, in order to enable the ray with the maximum opening angle of the sector-shape beam of rays to pass through the shielding body to form the flying spot, the heights of the end h of the incident groove ha and the end e of the incident groove de which are farthest from the transverse section W may be considered. Specifically, the sector-shape beam of rays of the radiation source P has an opening angle Y, as shown in FIG. 11, wherein the maximum upper opening angle is Y1 and the maximum lower opening angle is Y2, and the distance from the radiation source P to the side wall is L. It may be configured such that the distance from the end h of the incident groove ha to the transverse section W is L*tanY1, and the ray corresponding to the maximum upper opening angle of the sector-shape beam of rays can just pass through the end h.

Similarly, in some embodiments of the present invention, it may be configured such that the distance from the end e of the incident groove de to the transverse section W is L*tanY2, and the ray corresponding to the maximum lower opening angle of the sector-shape beam of rays can just pass through the end e.

When the above requirements on the heights of the ends h and e are both satisfied, the sector-shape beam of rays can completely pass through the shielding body to form the flying spots, thus resulting in a high utilization rate of the rays.

In some embodiments of the present invention, according to the factors of the shielding body, such as the circumference and height thereof, the number of the pairs of the helical grooves may be configured, such as three pairs, five pairs, ten pairs, sixteen pairs, etc. The larger the diameter of the shielding body is and/or the larger the height thereof is, the more the pairs of helical grooves are allowed to be configured.

Figure 15:
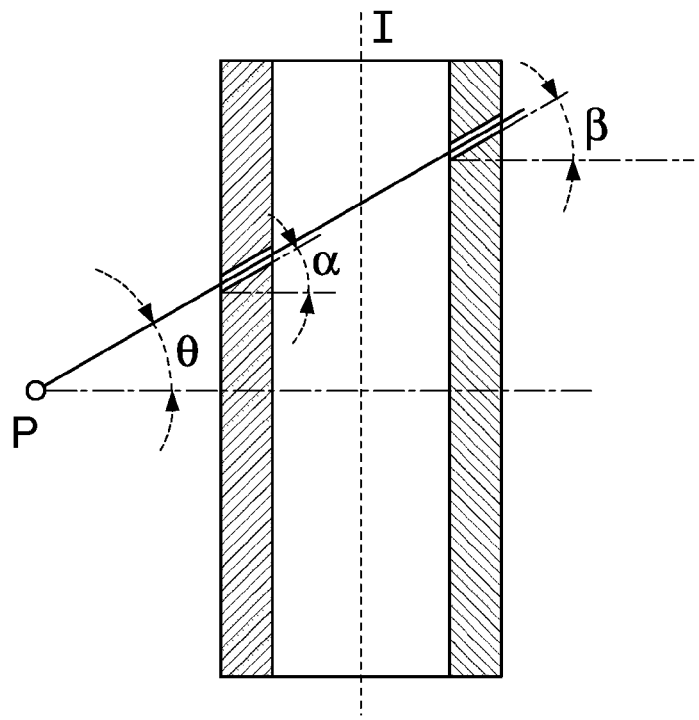
FIG. 15 is a longitudinal section view of a shielding body according to an embodiment of the present invention.

In addition, as the side wall of the shielding body has a certain thickness, the cut direction(s) of the helical grooves should be considered. FIG. 15 is a longitudinal section view of a shielding body according to an embodiment of the present invention. FIG. 15 schematically shows the cuts of one incident groove and the corresponding exit groove arranged in pair therewith on the side wall. Specifically, $\angle\theta$ is an angle of the emitting direction of one ray from the radiation source with respect to the horizontal plane, $\angle\alpha$ is an angle of the cut direction of the incident groove with respect to the horizontal plane, $\angle\beta$ is an angle of the cut direction of the exit groove with respect to the horizontal plane, and it should be configured such that $\angle\alpha=\angle\beta=\angle\theta$, to allow the ray to pass through the shielding body via the incident groove and the exit groove to form the flying spot. Otherwise, if $\angle\alpha\neq\angle\theta$ or $\angle\beta\neq\angle\theta$, the ray would not pass through the shielding body. Therefore, the cut direction of each helical groove should be configured according to the exit direction of the ray of the sector-shape beam of rays, to ensure that when the shielding body is rotating around the axis I, the ray can pass through the incident groove and the exit groove.

Figure 16:
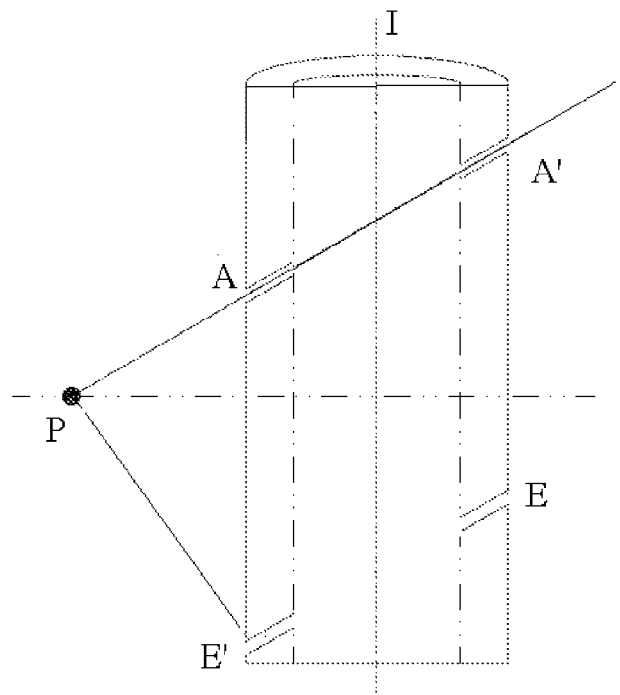
FIG. 16 is a side view showing an emitting process of a flying spot according to an embodiment of the present invention.

FIG. 16 shows a schematic process diagram of forming a flying spot by rotating a shielding body based on a flying spot forming apparatus according to an embodiment of the present invention. The Figure shows a longitudinal section of the shielding body. In the Figure, A is a cut of the incident groove ab at a time point and A' is a cut of the corresponding exit groove a'b'; similarly, E is a cut of the incident groove ef at this time point and E' is a cut of the corresponding exit groove e'f'. As can be seen, the ray from the radiation source P is emitted to pass through A and A' to form a flying spot, but cannot pass through E' or E. In addition, for other helical grooves on the shielding body, such as the incident groove ef and the exit groove e'f' in FIG. 16, though they correspond to each other in position and have the same cut direction, such cut direction will not allow the ray from the radiation source P to pass through at the time point as shown in the Figure. As the shielding body rotates, the spatial positions of ef and e'f' change, and when they are rotated to positions coinciding with the exit direction of the ray, the ray is allowed to pass through to form a flying spot.

As can be seen, according to the embodiment(s) of the present invention, the cut direction of the helical grooves can be designed such that during rotation of the shielding body, at a certain time point, only one desired flying spot can be formed, meeting the requirements on the flying spot forming apparatus.

When designing a flying spot forming apparatus according to practical application situation, the following contents may be considered:

1. The main body of the shielding body may be made of a material that can absorb the rays from the radiation source, such as alloys or composite material that contains W, Pb, Ta, and steel.

2. The shielding body may be made to have a bi-layer structure, wherein the main body in the inner layer of the shielding body is made of a material that can absorb the rays from the radiation source, while the outer layer is made of a material with low density and high strength, such as a carbon fiber or glass fiber based composite material, or metal materials with relatively low density (such as Al, steel, etc.), thus improving the mechanical properties of the shielding body.

3. The shielding body may be connected with an encoder which is used for obtaining position information and angular velocity information of the shielding body, to facilitate obtaining the exit direction of the ray flying spot, detecting the rotation operation state of the shielding body, and thus facilitate controlling the apparatus.

4. The shielding body may be connected with a deformation detecting sensor, such as an eddy current displacement sensor or a laser sensor, which is used for detecting whether the shielding body is deformed, thus ensuring normal operation of the shielding body as well as the accuracy of the scanning and detecting results.

5. The shielding body may be connected with a drawing wire displacement sensor which is used for cutting off the power that is provided for the rotation of the shielding body, when an accident occurs to the shielding body during its high speed rotation, thus ensuring safety of personnel and related devices.

According to the embodiments of the present invention, the number and positions of the helical grooves on the shielding body are configured reasonably. Through the invention, a complete scanned image can be obtained and moreover, the defect of being vulnerable to deformation due to over-long helical grooves can be avoided, the tension resistant properties of the shielding body can be improved, and the precision of the scanning and detecting results as well as the safety property of the devices can be improved.

Hereinbefore, technical solutions of the present invention are described in detail in combination with specific embodiments. The specific embodiments as described are used to facilitate understanding of the concept of the present invention. Any derivation or variation made by those skilled in the art based on the specific embodiments of the present invention will fall into the protection scope of the present invention.

The invention claimed is:

1. A flying spot forming apparatus, comprising a radiation source and a shielding body which is a hollow circular cylinder and has a side wall provided with helical grooves in pairs, with each pair of helical grooves comprising an incident groove and an exit groove, wherein, the side wall of the shielding body is provided with at least two pairs of helical grooves, and each helical groove has a predetermined slope with respect to a cross section of the shielding body;

a first incident groove of the at least two pairs of helical grooves, is adjacent to a second incident groove of the at least two pairs of helical grooves, a head end of the first incident groove is higher than a head end of the second incident groove, a tail end of the first incident groove is higher than a tail end of the second incident groove, the tail end of the first incident groove is spaced apart from the head end of the second incident groove by a predetermined distance, the tail end of the first incident groove is not higher than the head end of the second incident groove;

a first axial cross section of the shielding body intersects with the tail end of the first incident groove, a second axial cross section intersects with the head end of the second incident groove, and an included angle between the first and second axial cross sections is greater than 0 degree; and the position of the exit groove of the at least two pairs of helical grooves is aligned to the position of the incident groove that is arranged in pair with said exit groove such that a ray may pass therethrough.

2. The flying spot forming apparatus according to claim 1, wherein the incident grooves of the at least two pairs of helical grooves are distributed within a circumferential range of 0~360 degrees of the side wall of the shielding body.

3. The flying spot forming apparatus according to claim 1, wherein the slope of the first incident groove is different from the slope of the second incident groove.

4. The flying spot forming apparatus according to claim 1, wherein the tail end of the first incident groove of the at least two pairs of helical grooves is spaced apart from the head end of the second incident groove of the at least two pairs of helical grooves by a first distance, and the tail end of the second incident groove is spaced apart from a head end of a third incident groove of the at least two pairs of helical grooves by a second distance different from the first distance.

5. The flying spot forming apparatus according to claim 1, wherein the tail end of the first incident groove is at a same height as the head end of the second incident groove.

6. A flying spot forming apparatus, comprising a shielding body which is a hollow circular cylinder and has a side wall provided with elongate helical grooves in pairs, and a radiation source placed outside the shielding body, wherein the side wall of the shielding body is provided with N pairs of helical grooves and N≥2, with each pair of helical grooves comprising an incident groove and an exit groove, wherein with a single transverse section of the shielding body being referred to as a boundary, M pair(s) of helical grooves is/are placed at one side of the single transverse section while (N−M) pair(s) of helical grooves is/are placed at the opposite side of the single transverse section, wherein the transverse section of the shielding body is parallel to a bottom plane of the shielding body and M<N;

all the incident grooves are placed within a range covered by a sector-shape beam of rays from the radiation source, and any transverse section of the shielding body intersects at most two of the incident grooves;

each incident groove has an inclination angle with respect to the transverse section of the shielding body, and a predetermined distance is provided between two adjacent incident grooves; and the position of the exit groove is aligned to the position of the incident groove that is arranged in pair with said exit groove such that the ray may pass therethrough.

7. The flying spot forming apparatus according to claim 6, wherein, the incident groove where an incident point above and farthest from the single transverse section is located, is defined as the first incident groove, a perpendicular line from the radiation source to the side wall of the shielding body has a length of L, the ray corresponding to the maximum upper opening angle of the sector-shape beam of rays is at an angle $\varnothing 1$ with respect to the perpendicular line, and the head end of the first incident groove has a distance of $L*\tan \varnothing 1$ to the single transverse section.

8. The flying spot forming apparatus according to claim 6, wherein, the incident groove where an incident point below and farthest from the single transverse section is located, is defined as the $N_{th}$ incident groove, a perpendicular line from the radiation source to the side wall of the shielding body has a length of L, the ray corresponding to the maximum lower opening angle of the sector-shape beam of rays is at an angle $\varnothing 2$ with respect to the perpendicular line, and the tail end of the $N_{th}$ incident groove has a distance of $L*\tan \varnothing 2$ to the single transverse section.

9. The flying spot forming apparatus according to claim 6, wherein the side wall of the shielding body has a predetermined thickness, and the incident groove and exit groove arranged in pair have the same cut direction in the side wall.

10. The flying spot forming apparatus according to claim 6, wherein, in all the incident grooves, the $(x-1)_{th}$ incident groove, the $x_{th}$ incident groove and the $(x+1)_{th}$ incident groove are next to one another in sequence, the tail end of the $(x-1)_{th}$ incident groove is spaced apart from the head end of the $x_{th}$ incident groove by a first distance, and the tail end of the $x_{th}$ incident groove is spaced apart from the head end of the $(x+1)_{th}$ incident groove by a second distance, wherein x is a positive integer and $1<x<N$; the first distance is different from the second distance or the first distance is equal to the second distance.

11. The flying spot forming apparatus according to claim 6, wherein a main body of the shielding body is made of a material absorbing the rays from the radiation source, and the main body of the shielding body is covered at outside by a protection layer, wherein the protection layer is made of a material comprising one or more of: carbon fibers, glass fibers, and metals.

12. The flying spot forming apparatus according to claim 6, wherein the shielding body is connected with an encoder which is used for determining position information and angular velocity information of the shielding body.

13. The flying spot forming apparatus according to claim 6, wherein the shielding body is connected with a deformation detecting sensor which is used for detecting whether the shielding body is deformed.

14. The flying spot forming apparatus according to claim 6, wherein the shielding body is connected with a drawing wire displacement sensor which is used for cutting off the power that is provided for the rotation of the shielding body, when an accident occurs to the shielding body during its high speed rotation.

15. A method for designing a flying spot forming apparatus, the flying spot forming apparatus comprising a shielding body which is a hollow circular cylinder and a radiation source placed outside the shielding body, the designing method comprising:

according to a range covered by a sector-shape beam of rays from the radiation source and a size of the shielding body, determining an installing position of the radiation source;

arranging N pairs of elongate helical grooves on a side wall of the shielding body, with each pair of helical grooves comprising an incident groove and an exit groove and $N \geq 2$; wherein, as for arrangement of the N pairs of elongate helical grooves, with a single transverse section of the shielding body being referred to as a boundary, M pair(s) of helical grooves is/are placed at one side of the single transverse section while (N−M) pair(s) of helical grooves is/are placed at the opposite side of the single transverse section, wherein the transverse section of the shielding body is parallel to a bottom plane of the shielding body and M<N;

configuring all the incident grooves such that they are within the range covered by a sector-shape beam of rays from the radiation source and any transverse section of the shielding body intersects at most two of the incident grooves;

configuring each incident groove such that each incident groove has an inclination angle with respect to the transverse section of the shielding body, and a predetermined distance is provided between two adjacent incident grooves; and configuring the exit groove such that the position of the exit groove is aligned to the position of the incident groove that is arranged in pair with said exit groove such that the ray may pass therethrough.

16. The method for designing the flying spot forming apparatus according to claim 15, wherein, the incident groove where an incident point above and farthest from the single transverse section is located is defined as the first incident groove, a perpendicular line from the radiation source to the side wall of the shielding body has a length of L, the ray corresponding to the maximum upper opening angle of the sector-shape beam of rays is at an angle $\varnothing 1$ with respect to the perpendicular line, and the head end of the first incident groove is configured to have a distance of $L*\tan \varnothing 1$ to the single transverse section.

17. The method for designing the flying spot forming apparatus according to claim 15, wherein, the incident groove where an incident point below and farthest from the single transverse section is located, is defined as the $N_{th}$ incident groove, a perpendicular line from the radiation source to the side wall of the shielding body has a length of L, the ray corresponding to the maximum lower opening angle of the sector-shape beam of rays is at an angle $\varnothing 2$ with respect to the perpendicular line, and the tail end of the $N_{th}$ incident groove is configured to have a distance of L*tan Ø2 to the single transverse section.

18. The method for designing the flying spot forming apparatus according to claim 15, wherein the side wall of the shielding body has a predetermined thickness, and the incident groove and exit groove arranged in pair have the same cut direction in the side wall.

19. The method for designing the flying spot forming apparatus according to claim 15, wherein, in all the incident grooves, the $(x-1)_{th}$ incident groove, the $x_{th}$ incident groove and the $(x+1)_{th}$ incident groove are next to one another in sequence, the tail end of the $(x-1)_{th}$ incident groove is spaced apart from the head end of the $x_{th}$ incident groove by a first distance, the tail end of the $x_{th}$ incident groove is spaced apart from the head end of the $(x+1)_{th}$ incident groove by a second distance, wherein x is a positive integer and 1<x<N; the first distance is different from the second distance or the first distance is equal to the second distance.

20. The method for designing the flying spot forming apparatus according to claim 15, wherein, a main body of the shielding body is made of a material absorbing the rays from the radiation source, and the main body of the shielding body is covered at outside by a protection layer, wherein the protection layer is made of a material comprising one or more of: carbon fibers, glass fibers, and metals.

* * * * *